United States Patent [19]

David

[11] Patent Number: 5,879,796
[45] Date of Patent: Mar. 9, 1999

[54] ORGANIC/INORGANIC PARTICULATES

[75] Inventor: Israel A. David, Wilmington, Del.

[73] Assignee: E. I. du Pont de Nemours and Company, Wilmington, Del.

[21] Appl. No.: 908,879

[22] Filed: Aug. 8, 1997

Related U.S. Application Data

[60] Provisional application No. 60/025,510 Sep. 5, 1996.

[51] Int. Cl.$^6$ ................................. B32B 5/16; C08K 3/00
[52] U.S. Cl. .......................... 428/323; 428/327; 428/331; 428/402; 523/340; 524/493; 524/494; 528/502 E
[58] Field of Search ..................................... 428/402, 323, 428/327, 331; 524/493, 494; 523/340; 528/502 E

[56] References Cited

U.S. PATENT DOCUMENTS

| | | | |
|---|---|---|---|
| 3,151,095 | 9/1964 | Stone et al. | 260/37 |
| 3,399,069 | 8/1968 | Bridgeford | 106/164 |
| 5,028,482 | 7/1991 | Jeffs | 428/323 |
| 5,043,369 | 8/1991 | Bahn et al. | 523/466 |
| 5,252,654 | 10/1993 | David et al. | 524/414 |
| 5,277,931 | 1/1994 | Maglio et al. | 427/212 |
| 5,532,320 | 7/1996 | Tripathy et al. | 525/100 |
| 5,707,779 | 1/1998 | Naito et al. | 430/270 |
| 5,736,109 | 4/1998 | Howorth et al. | 422/179 |

FOREIGN PATENT DOCUMENTS

| | | | |
|---|---|---|---|
| 281082 | 9/1988 | European Pat. Off. | C08G 79/00 |
| 5-254819 | 10/1993 | Japan | C01B 33/12 |
| 7-265686 | 10/1995 | Japan | B01J 13/02 |

OTHER PUBLICATIONS

B. M. Novak et al., Simultaneous Interpenetrating Networks of Inorganic Glasses and Organic Polymers, *Polym. Prepr. (Am. Chem. Soc. Div. Polym. Chem.)*, 31 (2), 698–699, 1990.

*Primary Examiner*—Hoa T. Le

[57] ABSTRACT

This invention concerns an organic/inorganic composite in particulate form prepared by spray drying a solution or dispersion comprising an organic polymer and an inorganic glassy polymer precursor under such conditions that the inorganic glassy polymer precursor forms an inorganic glassy polymer to yield the particulate. Such particulates are useful as reinforcing agents for polymers and in monolithic structures prepared by compression of a plurality of said particulates.

10 Claims, No Drawings

ORGANIC/INORGANIC PARTICULATES

This application claims the priority benefit of U.S. Provisional Application No. 60/025,510, filed Sep. 5, 1996.

This invention relates to organic/inorganic composites, and more particularly to organic/inorganic composites in particulate form.

BACKGROUND OF THE INVENTION

Reinforcement of organic polymers with inorganic materials such as glass, graphite, and clays provides improved properties such as stiffness. The amount of improvement depends on the aspect ratio (ratio of major to minor dimension) of the inorganic material and on its adhesion to the host organic polymer. Often additional components such as coupling agents must be used to provide the adhesion to the host polymer. In addition, the reinforcement provided by the inorganic materials is generally anisotropic in orientation. Although monolithic structures can be readily prepared from macroscopically reinforced polymers, it is more difficult to prepare them from the intimate type of organic/inorganic interpenetrating or semi-interpenetrating composites of the type described in U.S. Pat. No. 5,252,654 because they tend to be brittle, cracked and warped due to shrinkage resulting from solvent evaporation during their preparation.

It is an object of the present invention to provide an inorganic/organic composite in a particulate form. It is an object of the present invention to provide a reinforced polymer having a reinforcing agent with a high aspect ratio. It is also an object of the present invention to provide a reinforcing agent that possesses isotropic orientation and/or does not require the use of an additional component to provide the adhesion necessary between it and the host polymer. It is a further object of the present invention to provide intimately reinforced monolithic structures that do not warp, crack, or shrink.

SUMMARY OF THE INVENTION

The present invention provides a particulate, comprising: an interpenetrating network, a semi-interpenetrating network or a mutual dispersion of (a) from about 15 to about 90% by volume of an inorganic glassy polymer component, and (b) from about 10 to about 85% by volume of an organic polymer component, wherein the particle size of the particulate is about 1.0 $\mu$m to about 30 $\mu$m.

The present invention also provides a process for preparing a particulate comprising an interpenetrating network, a semi-interpenetrating network or a mutual dispersion of (a) from about 15 to about 90% by volume of an inorganic glassy polymer component, and (b) from about 10 to about 85% by volume of an organic polymer component, comprising the steps of:

contacting an organic polymer and an inorganic glassy polymer precursor system together in the presence of a solvent to form a solution or a dispersion; and spray drying the solution or the dispersion under such conditions that the inorganic glassy polymer precursor system forms an inorganic glassy polymer to yield the particulate having a particle size of about 1.0 $\mu$m to about 30 $\mu$m.

The present invention further provides a reinforced polymer, comprising: an organic polymer having dispersed therein at least one particulate, said particulate comprising an interpenetrating network, a semi-interpenetrating network or a mutual dispersion of from about 15 to about 90% by volume of an inorganic glassy polymer component, and from about 10 to about 85% by volume of an organic polymer component, wherein the particle size of the particulate is about 1.0 $\mu$m to about 30 $\mu$m.

The present invention further provides a monolithic structure, comprising: a plurality of compressed particulates, each of said particulates comprising an interpenetrating network, a semi-interpenetrating network or a mutual dispersion of (a) from about 15 to about 90% by volume of an inorganic glassy polymer component, and (b) from about 10 to about 85% by volume of an organic polymer component, wherein the particle size of each of said particulates is about 1.0 $\mu$m to about 30 $\mu$m.

The present invention also provides a process for preparing a monolithic structure, comprising:

compressing material comprising a plurality of particulates, each of said particulates comprising an interpenetrating network, a semi-interpenetrating network or a mutual dispersion of (a) from about 15 to about 90% by volume of an inorganic glassy polymer component, and (b) from about 10 to about 85% by volume of an organic polymer component, wherein the particle size of each of said particulates is about 1.0 $\mu$m to about 30 $\mu$m, at a temperature ranging from ambient to a temperature at which the organic polymer component can fuse with itself but not flow, and at a pressure greater than about 50,000 psi (3.45×10$^{12}$ kPa) to form the monolithic structure.

DETAILED DESCRIPTION

The particulates disclosed herein are particles of about 1.0 $\mu$m to about 30 $\mu$m in size and are composites of an inorganic glassy polymer and an organic polymer which composites comprise an interpenetrating network, a semi-interpenetrating network or a mutual dispersion of (a) from about 15 to about 90% by volume of an inorganic glassy polymer component, and (b) from about 10 to about 85% by volume of an organic polymer component. Such particles can be made by expanding upon and adapting the process disclosed in U.S. Pat. No. 5,252,654 (incorporated by reference herein) in such a manner that solution(s) or dispersion(s) are broken up into small globules and the solvent is evaporated by a spray drying process. This expansion and adaptation of the process has the advantage that the brittleness associated with such previous structures aids in size reduction in the preparation of the present particles. The particles resulting from this present process can then be used to reinforce organic polymers or in the preparation of compressed monolithic structures.

Particle size can be measured by laser light scattering on a Microtrac FRA full range analyzer or Microtrac SPA small particle analyzer (Leeds and Northrup, North Wales, Pa.) and on a Mastersize/E (Malvern Instruments, Inc., Southborough, Mass.). Samples can be prepared for measurement by dispersing them in water or other appropriate liquids such as aliphatic hydrocarbons with or without surfactants by sonication for 1 min.

The term "inorganic glassy polymer" refers to a glassy inorganic compound which has bonds linking the atoms of the inorganic glassy polymer into a network, and which does not have any carbon atoms in the skeleton of the network, although carbon atoms may be present on side chains or groups which are pendent on the skeleton. The term "glassy" is used to describe a substance that behaves much like a solid but is not crystalline. Typical inorganic glassy polymers include, but are not limited to, oxides of Al, B, Si, Sn, Ti, and Zr. Also useful are various other aluminum compounds, such as aluminum phosphate. Preferred inorganic glassy polymers (in both the particulate disclosed herein and the process for producing it) are silica, titania, alumina, zirconia, and aluminum phosphate, and especially preferred are silica, titania and alumina. It is contemplated that some of the bonds to the metal or metalloid atoms of the inorganic glassy polymer may not be part of the skeleton of the glassy network (e.g., some may have nonbridging groups such as —OH attached to them).

An "organic polymer" refers to a polymer that contains carbon atoms in the main chain. An organic polymer used in the present invention must be soluble in one or more solvents. Preferred solvents are common organic solvents or water. Representative examples of useful organic polymers are polyolefins, poly(vinyl ethers), poly(vinyl esters), poly(acrylate esters), poly(methacrylate esters), polyacrylamides, polyacrylonitrile, polystyrenes, polyethers, polyketones, polyamides, polyesters, polycarbonates, polyimides, and copolymers, such as acrylic ester copolymers, e.g., styrene/n-butyl methacrylate/n-butyl acrylate/hydroxypropyl acrylate. Preferred among these polymers are poly(vinyl alcohol), poly(2-ethyloxazoline), poly(ethylene oxide), poly(methyl methacrylate), poly(caprolactam) (nylon-6), and poly(vinylpyridine). All of the organic polymers or copolymers may be branched or linear, but all must be soluble or dispersible in a solvent.

The inorganic glassy polymer component and the organic polymer components together form an interpenetrating network, a semi-interpenetrating network or a mutual dispersion. The term "interpenetrating network" is used herein to mean that both the organic polymer component and the inorganic glassy polymer component are continuous and cross-linked. The term "semi-interpenetrating network" is used herein to mean that both components are continuous but that only one of the components is cross-linked. The term "mutual dispersion" is used herein to mean that either the organic polymer component or the inorganic glassy polymer component is discontinuous, e.g., comprises domains. However, not included within the definition of a mutual dispersion are particles of one component coated with the other component. It is the nature and selection of the inorganic glassy polymer component and organic polymer component of the present invention, as set forth above, and the conditions under which they are processed which dictate the type of relationship between the inorganic glassy polymer component and organic polymer component. An interpenetrating or semi-interpenetrating network is preferred.

The interpenetrating or semi-interpenetrating network can be of a single phase, two phases or multi-phases. Single phase particulates are preferred. By "phase" is meant a state of matter wherein the components of the phase cannot be separated above a molecular scale. For purposes of this invention, "single phase" shall mean that the particulates give no detectable indication of the glass transition temperature ($T_g$) or crystalline melting point ($T_m$) of the organic polymer component as measured by Differential Scanning Calorimetry (DSC) which is well known to those skilled in the art. As used herein a change of less than 10% of the expected heat capacity or enthalpy change based on the volume fraction of the organic polymer in the DSC scan shall mean that no $T_g$ or $T_m$ has been detected. For single phase particulates, the organic polymer component will not be extractable after formation of the claimed particulate, even though such polymer was not chemically altered while the particulate was formed. The two and multiphase interpenetrating networks particulates will have a detectable $T_g$ or $T_m$. Mutual dispersions will also have detectable $T_g$ or $T_m$.

The inorganic glassy polymer component is within the range from about 15 to about 90 percent (by volume) of the present particulate with from about 10 to about 85 percent (by volume) of the present particulate being the organic polymer component. Preferred is a particulate having from about 30 to about 60 percent (by volume) of the inorganic glassy polymer component and from about 40 to about 70 percent (by volume) of the organic polymer component.

The term "inorganic glassy polymer precursor system" describes the compounds needed in solution to form (or effect formation of) the inorganic glassy polymer. The inorganic glassy polymer precursor system will always include at least one compound that contains the metallic or metalloid element present in the inorganic glassy polymer, will usually include a coreactant for that compound, and may include one or more catalysts (or retardants) to speed up, slow down, or otherwise affect the formation of the inorganic glassy polymer. For example, in order to form a silica inorganic glassy polymer, one may use a tetraalkyl silicate as the compound containing the Si, use water as the coreactant, and use a catalyst, such as HCl, which speeds up the reaction to form silica and tends to initially make less highly branched silica, which is desirable. A further example would be the formation of an aluminum phosphate inorganic glassy polymer, wherein an aluminum compound such as aluminum isopropoxide could be used; with phosphoric acid as the coreactant. Such inorganic glassy polymer precursor systems and their chemistries are further described in European Patent Application 281,082, which is hereby incorporated by reference.

Although generally all components of the inorganic glassy polymer precursor system should be soluble in the solvent in which the process is carried out, the compound containing the metal or metalloid need only be partially soluble at the start of the process, so long as before extensive condensation of the inorganic glassy polymer precursor system has occurred, all of the compound containing the metal or metalloid is in solution. The compound may fully dissolve while condensing because it reacts to form more soluble compound(s), or because the composition of the solution has changed (as by removal of some solvent) so that the compound is now soluble.

The solvent used in the process for making the particulates disclosed herein should be capable of dissolving or dispersing all of the components used in the process, preferably dissolving all of the components with the optional exception of the compound containing the metal or metalloid atom. As stated above, before extensive gelation of the inorganic glassy polymer has occurred, all of the components should preferably be in solution. Therefore, the solvent chosen is preferably an effective solvent for the organic polymer.

It is characteristic that the organic polymer component of single phase particulates of the invention are unextractable by solvent, even by solvents in which the organic polymer is normally soluble. By unextractable is meant that no more than 5%, and preferably no more than 1%, of polymer present can be extracted. However, solvents that are able to chemically attack (chemically react with) either the inorganic glassy polymer or organic polymer so as to dissolve either the organic polymer or inorganic glassy polymer are not included within the definition of solvents suitable for the purposes of this invention.

The properties of nonextractability and lack of a DSC event for the single phase particulates are believed to be due to the uniform distribution of the organic polymer component in the inorganic glassy polymer component. This type of composite can also be described as homogeneous. It is believed that no $T_g$ or $T_m$ can be detected and the organic polymer cannot be extracted by solvent because the organic polymer molecules are dispersed in the inorganic glassy polymer network at a molecular or at a near molecular level. The entanglement of the organic polymer molecules with the inorganic glassy polymer will not allow extraction of the organic polymer or formation of "bundles" of organic polymer large enough to have a $T_g$ or $T_m$.

The present invention also provides a process for preparing a particulate comprising an interpenetrating network, a semi-interpenetrating network or a mutual dispersion of (a) from about 15 to about 90% by volume of an inorganic glassy polymer component, and (b) from about 10 to about 85% by volume of an organic polymer component, comprising the steps of: contacting an organic polymer and an inorganic glassy polymer precursor system together in the presence of a solvent to form a solution or a dispersion; and spray drying the solution or the dispersion under such conditions that the inorganic glassy polymer precursor system forms an inorganic glassy polymer to yield the particulate having a particle size of about 1.0 μm to about 30 μm.

In the process of preparing the particulate, the organic polymer, a solvent, the inorganic glassy polymer precursor, all as described above for the present particulate, a catalyst and water are combined. Both the organic polymer and the inorganic glassy polymer precursor are soluble or dispersible in the common solvent. It is first necessary to choose the organic polymer and inorganic glassy polymer desired for the solution or dispersion. Then, the necessary components of the inorganic glassy polymer precursor system from which the inorganic glassy polymer will be derived are determined. In the particulates and process disclosed herein, more than one organic polymer and/or more than one inorganic glassy polymer may be present. However, the greater number of polymers, or potentially polymeric ingredients chosen, the more complicated it will be to maintain a one phase system during the critical periods of the process, (e.g., to have gel formation so that the organic polymer is trapped in the inorganic glassy polymer network).

Next a solvent should be chosen. The solvent can dissolve or disperse the organic polymer, the coreactant, and (eventually) the compound(s) containing the metal or metalloid atom. In addition, the volatility of the solvent is usually an important consideration. Generally all components of the inorganic glassy polymer precursor system should be soluble or dispersible in the solvent in which the process is carried out. The compound containing the metal or metalloid need only be partially soluble at the start of the process, so long as at some point before gelation of the inorganic glassy polymer, all of the compound containing the metal or metalloid is in solution. The solvent selected should be capable of easily and completely dissolving or dispersing the organic polymer. Solvents for many common polymers are known, see for example O. Fuchs in J. Brandrup and E. H. Immergut, Ed., Polymer Handbook, 3rd Edition, John Wiley & Sons, New York, 1989, p. VII379–VII407. For single phase particulates, it is critical to the process that the solvent help maintain the process ingredients in a single phase as long as possible, and at least until the mesh size of the inorganic glassy polymer gel is small enough to entrap the organic polymer. Therefore solvents that are good solvents for the organic polymer and the inorganic glassy polymer just before gelation are particularly preferred. It has been found that solvents that have solubility parameters within the range of the solubility parameters of the other ingredients are particularly likely to provide a successful outcome.

Methods of choosing and changing solvents are known to those skilled in the art. Changing the rates of reaction of various types of inorganic glassy polymer precursor systems are known to those skilled in the art, see for example European Patent Application 281,082, H. Schmidt, J. Non-Cryst. Sol., vol. 112, p. 419–423 (1989), and C. J. Brinker and G. W. Scherer, Sol-Gel Science, Academic Press, Boston, 1990, each herein incorporated by reference.

If an acid catalyst is used, the inorganic glassy polymer is more linear. If an alkali catalyst is used, the inorganic glassy polymer is more highly branched.

Optionally, the solution or dispersion may be allowed to age, and optionally the solution or dispersion may be filtered prior to spray drying. In order to minimize the time needed to carry out the process, a relatively concentrated solution of the organic polymer and inorganic glassy polymer precursor system can be used initially, and the solution can be allowed to "pre-age" before allowing solvent to evaporate via spray drying. "Pre-aging" means allowing the inorganic glassy polymer precursor system sufficient time to allow the inorganic glassy polymer precursor system to react. For example, in a system in which silica or alumina are the inorganic glass, the most common precursors are compounds that hydrolyze (formally) to $Si(OH)_4$ or $Al(OH)_3$. In this case, the preaging time for the aluminum system may only be a few seconds, since these reactions are often very fast, while the pre-aging time for the silicon system may be several hours, since these reactions are often slower. Those skilled in the art will be familiar with the reaction rates of the different types of systems.

The preparation of single-phase organic/inorganic composites of the type described in U.S. Pat. No. 5,252,654 requires evaporation of solvent at such rates and under such conditions that all components are commonly soluble in one another at the point that the mesh size of the developing inorganic network has become small enough to entrap the polymer molecules. This trapping prevents the organic polymer molecules from diffusing together into larger domains (phases) as the inorganic glassy polymer gel is further formed. The present spray drying process is ideally suited to provide the requisite rate and conditions needed for preparation of single-phase particulates. The very rapid evaporation of solvent in this process leads to formation of an entrapping mesh size before phase separation can occur.

During spray drying, the solution or dispersion is sprayed through a nozzle into a heated chamber of a spray drying apparatus in which the solvent evaporates. The temperature should be high enough to fully evaporate the solvent without causing the resulting particulates to fuse or degrade. For many systems a higher pressure can give small particles. It is also the case that for many systems lower feed rates tend to give smaller particles. A liquid nozzle orifice diameter of less than about 1000 μm is preferable in the spray drying process. Particles are collected in a "cyclone" wherein centrifugal force deposits the particulates of the present invention on the walls of the cyclone. Particulates not so collected can be further deposited on a filter or an electrostatic collector. Brittleness and cracking arising from solvent evaporation during spray drying helps to provide smaller particles.

The particulates of the present invention are useful in the reinforcement of a polymer to provide increased stiffness and strength in molded and extruded articles. Thus, the present invention further provides a reinforced polymer, comprising: an organic polymer having dispersed therein at least one particulate, said particulate comprising an interpenetrating network, a semi-interpenetrating network or a mutual dispersion of from about 15 to about 90% by volume of an inorganic glassy polymer component, and from about 10 to about 85% by volume of an organic polymer component, wherein the particle size of the particulate is about 1.0 μm to about 30 μm.

The organic polymer to be reinforced with a particulate of the present invention can be the same or different from the organic polymer component of the particulate used for reinforcement. Preferably the organic polymer to be reinforced is compatible (capable of forming physical bonds) with the organic polymer component of the particulate. It is desirable that the diameter of the particulate is sufficiently smaller than the dimensions of the polymeric article to be reinforced that the particulates are not detectable as bumps on the surface of a coating, molded article or extruded article comprising the polymer having dispersed therein the present particulates. Most preferably the organic polymer to be reinforced is the same as the organic polymer within the particulate.

It is believed that the reinforcement of polymers is improved because of the combination of compatibility provided by the organic polymer and the stiffness provided by the inorganic glassy polymer component. The particulates, if of a single phase, provide a reinforcing agent that is molecular, and thus, has a high length to diameter ratio which provides much larger reinforcement than that obtained with standard types of reinforcing agents having lower length to diameter ratios by virtue of their size. The reinforcement is in all directions because of the isotropic orientation of the reinforcing molecules (others are generally anisotropic).

In order to prepare the reinforced polymer of the present invention, the particulate material is contacted with a polymer matrix which polymer can be the same or a different polymer from the polymeric component of the particulate material. Preferably the particulates and the polymer matrix are mixed sufficiently to provide a uniformly mixed reinforced polymer matrix.

The particulate of the present invention is useful in the preparation of a monolithic structure. Thus, the present invention further provides a monolithic structure, comprising: a plurality of compressed particulates, each of said particulates comprising an interpenetrating network, a semi-interpenetrating network or a mutual dispersion of (a) from about 15 to about 90% by volume of an inorganic glassy polymer component, and (b) from about 10 to about 85% by volume of an organic polymer component, wherein the particle size of each of said particulates is about 1.0 μm to about 30 μm. By compressing the plurality of particulates, monolithic structures, such as pellets, discs and other shaped articles, can be prepared. During compression, the particulates are not melted. The temperature during compression can range from ambient to a temperature at which the organic polymer component can fuse with itself but not flow. The pressure should be greater than about 50,000 psi (3.45× $10^{12}$ kPa). Optionally vacuum can be applied to remove air and possibly residual solvent entrapped or entrained in the particulate mass. In single phase organic/inorganic composites, the compression procedure of the present invention avoids solvent evaporation that leads to the shrinkage of monolithic structures when prepared directly from solution. Compression can take place with or without evacuation either before or during compression.

The monolithic structures formed can range from almost translucent to opaque. The absence of complete clarity indicates that there is not complete coalescence of the particulates. Even so, the particulates of the present invention demonstrate more interparticle cohesivity than particulates from an inorganic component alone.

EXAMPLES

Example 1
Particulates of PVOH and $SiO_2$ with Wt. Ratio of 33/67

After aging for 3 days, a solution containing 57.5 g of a 10% aqueous poly(vinyl alcohol) (PVOH) solution, 247 g of additional water, 39.9 g of tetraethyl orthosilicate (TEOS), and 0.8 cc of 12M aqueous HCl solution was filtered. The filtrate was spray-dried at 60° C. under a $N_2$ atmosphere (1.5% $O_2$) through a #1A nozzle (406 μm liquid diameter orifice size) on a Yamato minispray dryer model DL-41 (available from Yamato Scientific Co., Orangeburg, N.Y.) with atomizing air set at 3.0, pump setting of 0.2–0.3, drying air at 0.57–0.58 $m^3$/min, and outlet temperature of 37°–45° C. The resulting white fluffy powder had a median particle size of 4.59 μm. In another sample made in a similar fashion, except from a more concentrated solution and at 80° C., there was evidence of neither a $T_g$ nor a melting point, indicating that the particulates consisted of only one phase.

Example 2
Particulates of PEOX and $SiO_2$ with Wt. Ratio of 36/64

A solution containing 5.8 g of poly(ethyloxazoline) (PEOX), 259.6 g of ethanol, 39.9 g of TEOS, 17.2 g of water, and 0.8 cc of 12M aqueous HCl solution was aged for 1 week, and then sprayed dried as in Example 1, except at 80° C. with a slow feed and outlet temperature of 52°–56° C. A white powder amounting to 8.1 g (46.9% yield) was collected. Median particle size was 4.39 μm. In differential scanning calorimetry (DSC), the $T_g$ of the PEOX component was missing, indicating a single phase. Elemental analysis showed the ratio of PEOX to $SiO_2$ to be 36.1/63.9, close to that of 33/67 intended. The low yield was apparently due to loss of the very fine particles in the emission stack of the spray drying apparatus. Evidence for this loss was gathered in another experiment run in a similar fashion. Particulates from three different locations in the spray drying apparatus gave different median particle sizes: chamber 7.99 μm, cyclone and collector 4.64 μm, exhaust trunk 3.28 μm.

Example 3
Particulates of Acrylic Ester Copolymer and $SiO_2$

A solution made from 20.0 g of styrene/n-butyl methacrylate/n-butyl acrylate/hydroxypropyl acrylate 15/30/17/38 copolymer of $M_n$=3000, 148.5 cc of TEOS, 356 cc of butoxyethanol, 770 cc of 2-propanol, 60 cc of water, and 2.8 cc of 12M aqueous HCl solution was aged overnight, and spray dried in similar fashion to that of Example 1, except that drying air was at 0.42–0.43 $m^3$/min, inlet temperature was 126°–150° C., and outlet temperature 77°–88° C. A fluffy white powder, weighing 44 g (73.3%) was recovered from the cyclone. Its median particle size was 2.61 μm. There was no $T_g$ in the DSC trace, indicating that the particulates were of single phase.

Example 4
Particulates of PEO and $SiO_2$

A filtered, overnight-aged solution made from 148.5 cc of TEOS, 20.0 g of poly(ethylene oxide) (PEO), 1039.8 g of water, 100 cc of ethanol, and 2.8 cc of 12M aqueous HCl solution was spray dried as in Example 1 with drying air at 0.42–0.48 $m^3$/min, inlet temperature 100°–170° C., and outlet temperature 58°–93° C. The white powder recovered from the cyclone weighed 36 g and that from the chamber, 6 g. Their respective median particle sizes were 12.98 gm and 20.11 µm, and elemental analysis showed $SiO_2$ content of 56.1 and 58.4%, respectively. DSC melting points showed that 7.7 and 8.2% of the PEO was present as a second phase.

Example 5
Particulates of PEOX and $TiO_2$

A filtered solution made up of 56.9 g of tetraisopropyl titanate, 10.3 cc of acetylacetone, 4 g of PEOX, 9.3 g of ethanol, 436.5 cc of 2-propanol, 18.0 cc of water, and 0.8 cc of 12M aqueous HCl solution that had aged for 2 months was spray dried as in Example 1 with drying air of 42–44 m³/min, inlet temperature of 100° C., and outlet temperature of 60° C. Median particle size of the resulting 16 g of yellowish powder was 14.0–21.9 µm. Elemental analysis showed a $PEOX/TiO_2$ ratio of 18.2/81.8, but also the presence of residual acetylacetone. DSC showed particulates to have no $T_g$ and thus were of a single phase.

Example 6
Particulates of PEOX and $SiO_2$ with Wt. Ratio of 60/40

Example 2 was repeated, except that the solution was made up to give a $PEOX/SiO_2$ ratio of 60/40, the drying air was 0.41–0.43 m³/min, and the outlet temperature was 51°–56° C. The median particle size was 4.29 µm. Elemental analysis showed a ratio of $PEOX/SiO_2$ of 61.3/38.7, and DSC showed no $T_g$.

Example 7
Particulates of $SiO_2$ (Control)

A solution made up of 74.3 cc of TEOS, 380 cc of ethanol, 30.0 cc of water, and 1.4 cc of 12M aqueous HCl solution was spray dried as in Example 6 with an outlet temperature of 54°–56° C. The resulting powder had a median particle size of 1.56 µm.

Example 8
Drawdown of Polymer Reinforced with Particulate

The particulates of Example 2 were stirred by hand into a solution of PEOX in ethanol in a sufficient amount to give an overall $PEOX/SiO_2$ ratio of 70/30. The resulting clear, viscous, bubbly dispersion was drawn down on a glass plate with a 20-mil doctor blade. The resulting coating appeared to contain clumped, inadequately dispersed particles. It was baked at 90°–100° C. for 30 min, sanded with 200, 400 and 600 grit sandpaper in that order, and rebaked at 85°–90° C. for 15 min. Despite the non-uniformity, hardness measured on a Tukon penetrometer tester, model FB (available from Wilson Instruments Division, Instron Corporation, Canton, Mass.) was 20.5 knoop hardness number (KHN). This value was equivalent to that (19.8 KHN) of a single phase PEOX/$SiO_2$ 70/30 composite and better than that of the polymer alone (15.3 KHN). Both of the latter drawdowns were prepared in the same way as the test item, except that they were not baked the second time.

Example 9
Drawdowns of Particulates Alone vs. Non-Particulate Composition

Undried particulates of $PEOX/SiO_2$ 33/67 and 60/40 made in a fashion similar to that of Example 2 and from Example 6, respectively, were dispersed in ethanol at 20% concentration. Drawdowns were made with a 20 mil doctor blade and baked at 80° C. under vacuum for 30 min. They were compared to controls from single-phase $PEOX/SiO_2$ composites (SPC) of the same ratios and same solution concentration made in the same way but without spray drying. Hardness was not as high for the particulates. Adhesion to glass was evaluated subjectively. Some portions of item C peeled. The other items adhered firmly.

| Item | $PEOX/SiO_2$ | Form | Appearance | Hardness (KHN) |
|------|--------------|------|------------|----------------|
| A | 33/67 | particulate | hazy, cracked | 25.2 |
| B | 60/40 | particulate | hazy, | 23.7 |
| C | 33/67 | SPC | clear, flaked | — |
| D | 60/40 | SPC | clear | 36.9 |

Example 10
Reinforced PEOX Monolithic Structures

Mixtures (2 g each) of powdered PEOX containing 20% particulates of $PEOX/SiO_2$ 33/67 SPC and $SiO_2$ were compression molded into tensile bars at 100° C. and 2000 lb force. PEOX control items were compressed at both 80 and 100° C. Tensile testing showed the SPC to give higher modulus (kpsi=kilopounds per square inch) than the $SiO_2$ reinforcing agent:

| Item | Additive | Tenacity (kpsi) | Elongation (%) | Modulus (kpsi) | Toughness (kpsi) |
|------|----------|-----------------|----------------|----------------|------------------|
| 1 | SPC | 1.25 | 104 | 154 | 1.7 |
| 2 | $SiO_2$ | 0.38 | 174 | 70 | 1.2 |
| 3 | none | 1.06 | 205 | 104 | 2.8 |

Example 11
Reinforced PMMA Monolithic Structure

Example 10 was repeated with poly(methyl methacrylate) (PMMA) in place of PEOX as the host polymer. The SPC particulates had been spray dried with drying air at 0.40–0.42 m³/min and an outlet temperature at 54°–55° C. Compression conditions were 170°–180° C. at 500–1000 lb for 2 min. Modulus was higher for the PMMA reinforced with the SPC than with the $SiO_2$:

| Item | Additive | Tenacity (kpsi) | Elongation (%) | Modulus (kpsi) | Toughness (kpsi) |
|------|----------|-----------------|----------------|----------------|------------------|
| 1 | SPC | 4.49 | 2.0 | 280 | 0.05 |
| 2 | $SiO_2$ | 5.68 | 2.9 | 204 | 0.08 |
| 3 | none | 5.98 | 5.1 | 252 | 0.16 |

Example 12
Compressed Particulate Disc

A 2 g sample of the powder obtained in Example 2 was compressed at room temperature at 100,000 psi for 1 minute. A smooth, opaque, white disc was obtained.

What is claimed is:

1. A particulate, comprising: an interpenetrating network, a semi-interpenetrating network or a mutual dispersion of (a) from about 15 to about 90% by volume of an inorganic glassy polymer component, and (b) from about 10 to about 85% by volume of an organic polymer component, wherein the particle size of the particulate is about 1.0 µm to about 30 µm.

2. The particulate of claim 1 wherein the inorganic glassy polymer component and the organic polymer component form a single phase interpenetrating or semi-interpenetrating network.

3. The particulate of claim 1 wherein the inorganic glassy polymer is silica.

4. A process for preparing a particulate comprising an interpenetrating network, a semi-interpenetrating network or a mutual dispersion of (a) from about 15 to about 90% by volume of an inorganic glassy polymer component, and (b) from about 10 to about 85% by volume of an organic polymer component, comprising the steps of:

contacting an organic polymer and an inorganic glassy polymer precursor system together in the presence of a solvent to form a solution or a dispersion; and spray drying the solution or the dispersion under such conditions that the inorganic glassy polymer precursor system forms an inorganic glassy polymer to yield the particulate having a particle size of about 1.0 $\mu$m to about 30 $\mu$m.

5. A reinforced polymer, comprising: a polymer having dispersed therein at least one particulate, said particulate comprising an interpenetrating network, a semi-interpenetrating network or a mutual dispersion of from about 15 to about 90% by volume of an inorganic glassy component, and from about 10 to about 85% by volume of an organic polymer component, wherein the particle size of the particulate is about 1.0 $\mu$m to about 30 $\mu$m.

6. The reinforced polymer of claim 5 in the form of a coating.

7. A monolithic structure, comprising: a plurality of compressed particulates, each of said particulates comprising an interpenetrating network, a semi-interpenetrating network or a mutual dispersion of (a) from about 15 to about 90% by volume of an inorganic glassy polymer component, and (b) from about 10 to about 85% by volume of an organic polymer component, wherein the particle size of each of said particulates is about 1.0 $\mu$m to about 30 $\mu$m.

8. The monolithic structure of claim 7 wherein the inorganic glassy polymer component and the organic polymer component form a single phase interpenetrating or semi-interpenetrating network.

9. The monolithic structure of claim 7 wherein the inorganic glassy polymer is silica.

10. A process for preparing a monolithic structure, comprising:

compressing material comprising a plurality of particulates, each of said particulates comprising an interpenetrating network, a semi-interpenetrating network or a mutual dispersion of (a) from about 15 to about 90% by volume of an inorganic glassy polymer component, and (b) from about 10 to about 85% by volume of an organic polymer component, wherein the particle size of each of said particulates is about 1.0 $\mu$m to about 30 $\mu$m, at a temperature ranging from ambient to a temperature at which the organic polymer component can fuse with itself but not flow, and at a pressure greater than about 50,000 psi ($3.45 \times 10^{12}$ kPa) to form the monolithic structure.

\* \* \* \* \*